United States Patent [19]
Gruender, Jr. et al.

[11] Patent Number: 5,193,194
[45] Date of Patent: Mar. 9, 1993

[54] CONCURRENT ARBITRATION SYSTEM AND METHOD FOR BUS CONTROL

[75] Inventors: Eugene H. Gruender, Jr.; Douglas R. Kraft, both of Austin, Tex.

[73] Assignee: Motorola, Inc., Schaumburg, Ill.

[21] Appl. No.: 742,154

[22] Filed: Aug. 1, 1991

Related U.S. Application Data

[63] Continuation of Ser. No. 566,791, Aug. 13, 1990, abandoned, which is a continuation of Ser. No. 259,559, Oct. 18, 1988, abandoned.

[51] Int. Cl.$^5$ ............................................. G06F 13/362
[52] U.S. Cl. ................................... 395/725; 395/425; 364/242.7; 364/937.01
[58] Field of Search ............... 395/725; 364/DIG. 1, 364/DIG. 2

[56] References Cited

U.S. PATENT DOCUMENTS

| | | | |
|---|---|---|---|
| 3,810,114 | 8/1974 | Yamada et al. | 364/200 |
| 3,995,258 | 11/1976 | Barlow | 364/200 |
| 3,997,896 | 12/1976 | Cassario et al. | 364/200 |
| 4,085,448 | 4/1978 | Kogge | 364/900 |
| 4,231,104 | 10/1980 | Clair | 364/900 |
| 4,394,728 | 7/1983 | Comfort et al. | 364/200 |
| 4,449,183 | 5/1984 | Flahive et al. | 364/200 |
| 4,493,036 | 1/1985 | Boudreau et al. | 364/200 |
| 4,511,960 | 4/1985 | Boudreau et al. | 364/200 |
| 4,536,839 | 8/1985 | Shah et al. | 364/200 |
| 4,570,220 | 2/1986 | Tetrick et al. | 364/200 |
| 4,627,018 | 12/1986 | Trost et al. | 364/900 |

Primary Examiner—David Y. Eng
Attorney, Agent, or Firm—Dale Jepsen; Walter W. Nielsen; Harold C. McGurk, IV

[57] ABSTRACT

A concurrent arbitration system and method are provided wherein the most recent requester retains control of a system resource under certain conditions and is allowed access to the resource during a portion of an arbitration cycle which will result in the granting of access to the resource by another requester. This overlapping of a resource access cycle and an arbitration cycle decreases the overall arbitration time and therefore reduces the overall resource access time.

10 Claims, 5 Drawing Sheets

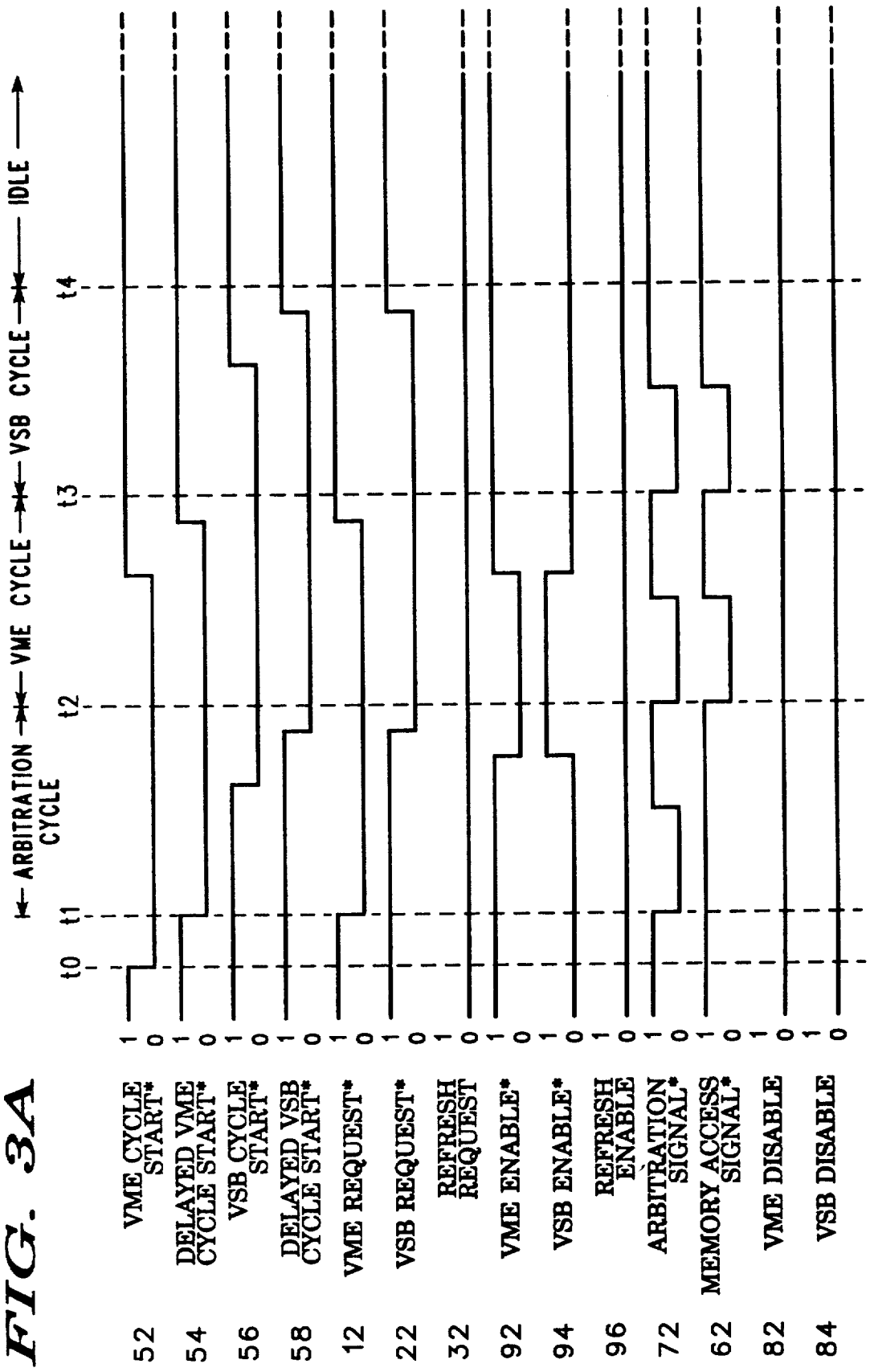

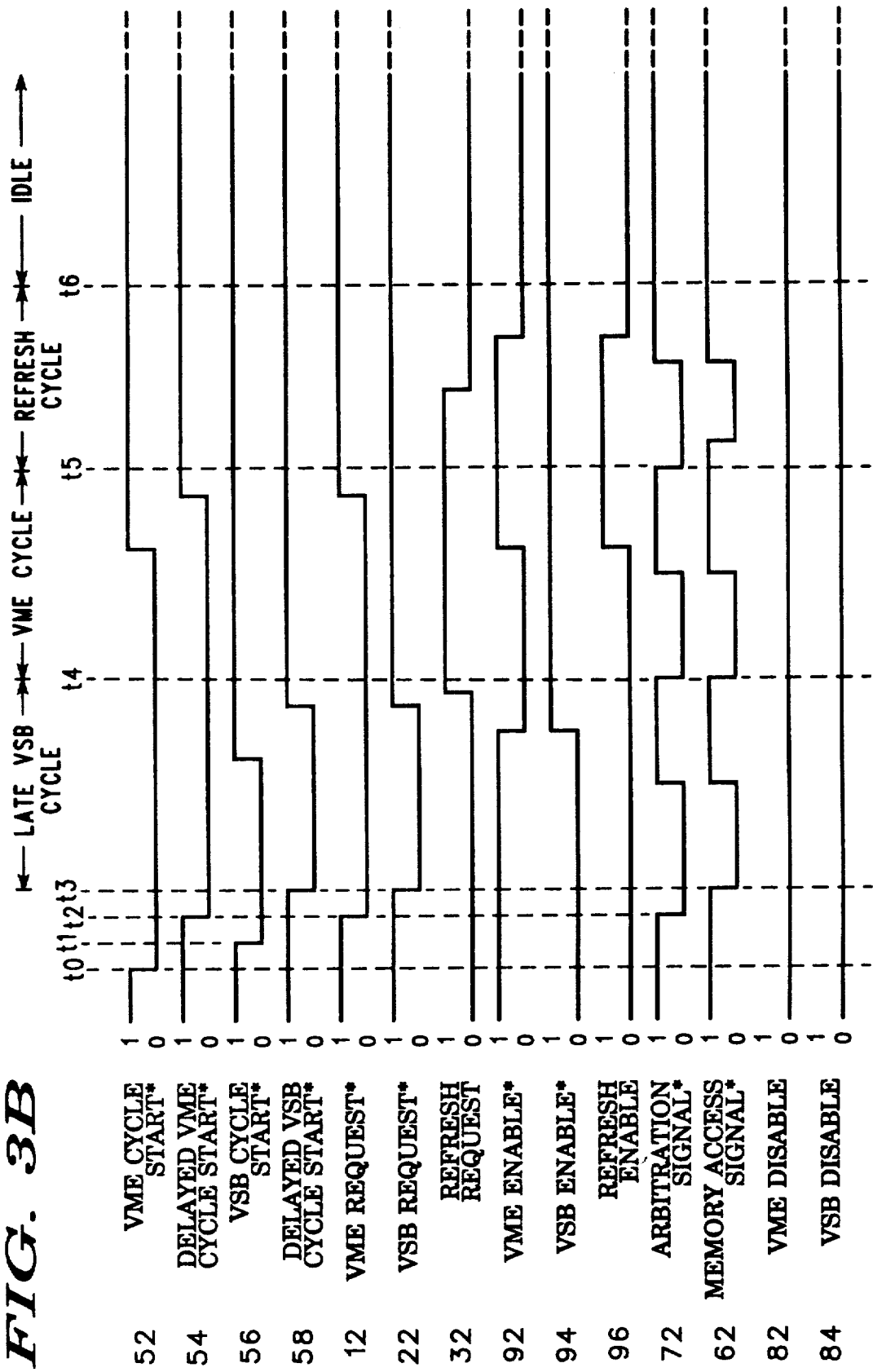

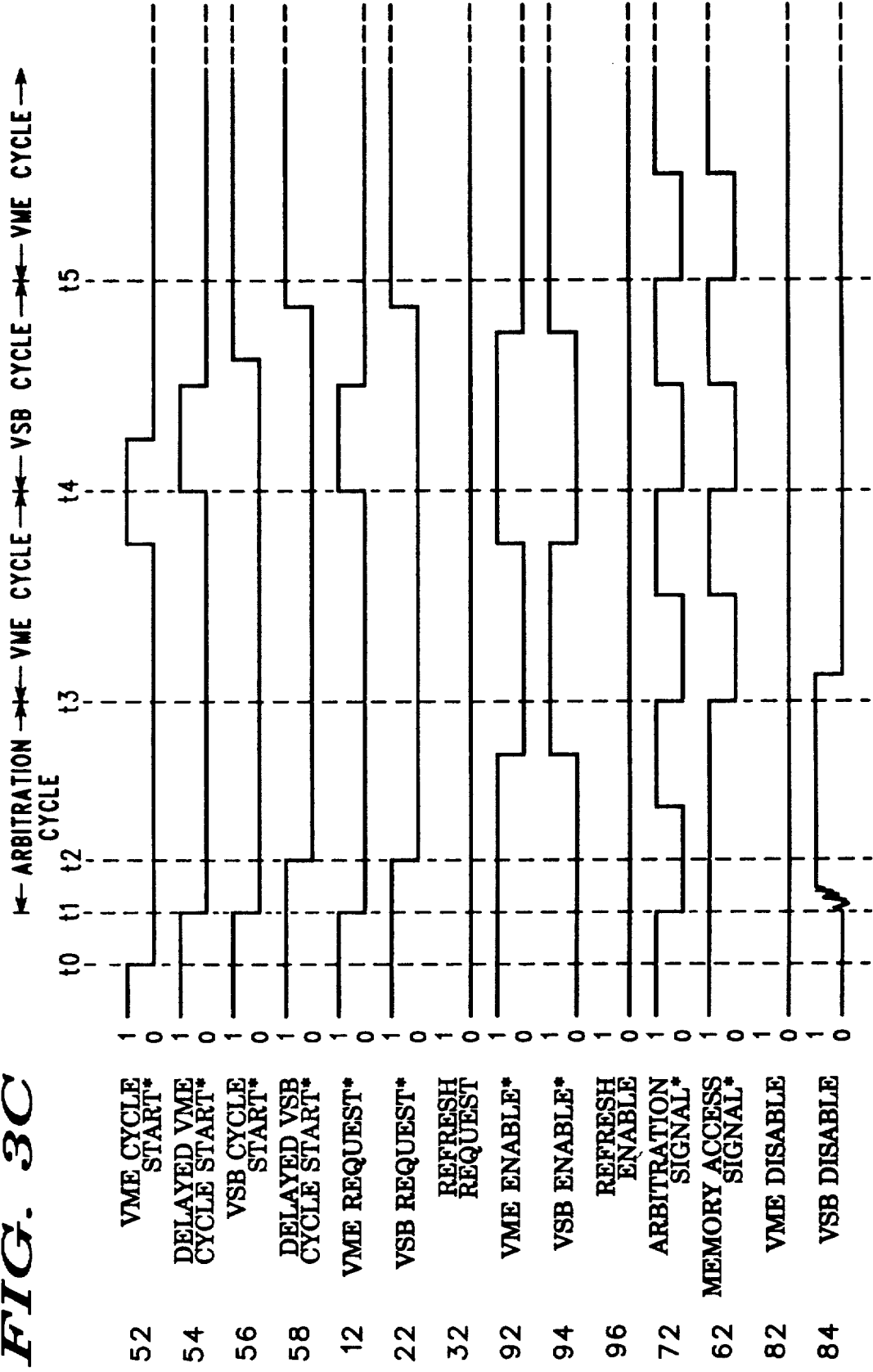

CONCURRENT ARBITRATION SYSTEM AND METHOD FOR BUS CONTROL

This application is a continuation of prior application Ser. No. 07/566,791 filed Aug. 13, 1990, now abandoned, which was a continuation of prior application Ser. No. 07/259,559 filed Oct. 18, 1988, now abandoned.

BACKGROUND OF THE INVENTION

This invention relates in general to arbitration systems and methods for an asynchronous bus computer system, and more particularly, to an arbitration system and method wherein control remains with the most recent previous user and under certain conditions access to the memory is allowed by the most recent previous requester while an arbitration cycle is occurring which will switch control to another requester. As a result of this overlap of the actual memory access cycle and a pending arbitration cycle the overall arbitration cycle, and therefore overall memory access time, is shorter.

There are currently available arbitration systems and methods for asynchronous bus computer systems. However, in these systems the access to a system resource such as a memory is ordinarily completed by a given requester before a subsequent arbitration cycle is begun. As a result the overall access time is relatively slow and becomes a significant factor at the higher clock speeds of recent computer systems.

SUMMARY OF THE INVENTION

It is therefore an object of the present invention to provide an arbitration system and method which results in a shorter overall resource access time.

Another object of the present invention is to provide a concurrent arbitration system and method for bus control comprising a memory access timing chain and a separate arbitration timing chain wherein under certain conditions a resource access cycle for one requester may take place during the arbitration cycle for another requester, thereby reducing the overall resource access time.

The foregoing and other objects are achieved in the present invention wherein there is provided a concurrent arbitration system comprising a VME address decode element, a VSB address decode element and a refresh element each having an output. The VME address decode element, VSB address decode element and refresh elements are coupled to a memory access logic and timing chain, an arbitration timing chain, and a sampling and disable circuit. VME cycle start and VSB cycle start signals are coupled to the sampling and disable circuit while delayed VME cycle start and VSB cycle start signals are coupled to the memory access logic and timing chain, arbitration timing chain and the sampling and disable circuit. The sampling and disable circuit has VME request and VSB request outputs coupled to an arbitration logic circuit, as well as a disable output coupled to the memory access logic and timing chain. The refresh element is also coupled to the arbitration logic circuit. The memory access logic and timing chain is coupled to the arbitration timing chain and has an output for coupling to a memory. The arbitration logic circuit receives arbitration clock signals from the arbitration timing chain and has VME enable, VSB enable and refresh enable outputs coupled to the sampling and disable circuit and the memory access logic and timing chain.

BRIEF DESCRIPTION OF THE DRAWINGS

The above-mentioned and other features of the invention and the manner of attaining them will become more apparent and the invention itself will be best understood by reference to the following description of an embodiment of the invention taken in conjunction with the accompanying drawings wherein:

FIG. 3A is a timing diagram illustrating a typical arbitration only cycle followed by a VME cycle and a VSB cycle;

FIG. 3B is a timing diagram illustrating a late VSB cycle followed by a VME cycle and a refresh cycle; and FIG. 3C is a timing diagram used to illustrate the function of the sampling and disable circuit when a VME request is followed closely by a VSB request.

DESCRIPTION OF THE PREFERRED EMBODIMENT

Figure 1:
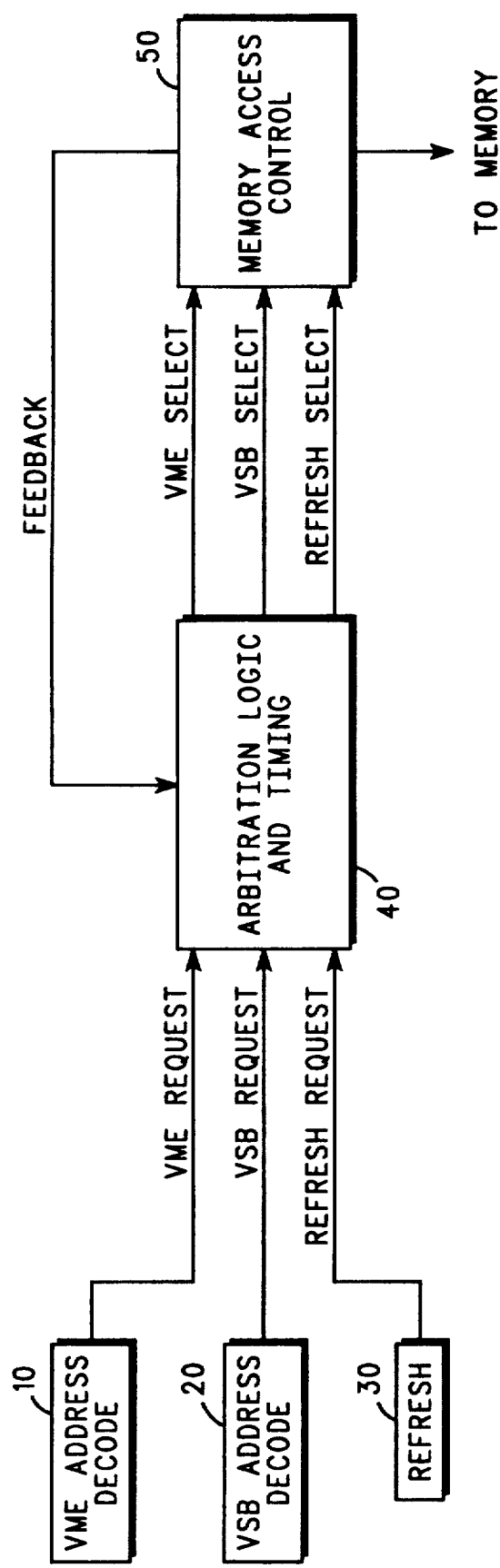
FIG. 1 is a general block diagram of a typical prior art arbitration system for an asynchronous bus computer system.

FIG. 1 illustrates in block diagram form a typical prior art arbitration system wherein VME address decode element 10, VSB address decode element 20 and refresh element 30, having VME request, VSB request and refresh request outputs respectively, are coupled to arbitration logic and timing element 40. Arbitration logic and timing element 40 has VME select, VSB select and refresh select outputs which are coupled to memory access control element 50. Memory access control element 50 has an output coupled to a system resource, in this case a memory, and also has a feedback output coupled back to arbitration logic and timing element 40. The VME request, VSB request and refresh request inputs to arbitration logic and timing element 40 represent asynchronous requests for access to the memory. Any one or all of these requests may be present as inputs to the arbitration logic and timing element at any given time. The selection of the actual request to be passed through as a select signal is accomplished by arbitration logic and timing element 40 in accordance with a predetermined priority. In the specific example shown the refresh request would ordinarily have the highest priority followed by VSB request and VME request in that order. Once the arbitration logic and timing element has accomplished an arbitration decision, the result is passed to memory access control element 50 as a select signal which enables the selected requester to gain access to the memory. Once this actual access to the memory has been granted for a given cycle, memory access control element 50 provides a feedback control signal to arbitration logic and timing element 40 which prevents any further arbitration or access grant until the memory access cycle is complete for the requester having control. Therefore, the next arbitration decision and memory access cycle will not begin until the current memory access cycle is complete. This will be true regardless of which requester is selected on the next cycle, including the requester which was most recently in control. It can be seen then that the total cycle time from a given access request to the completion of the actual memory access cycle will be a fixed period of time and will be the same regardless of the relative timing or order in which the requests are received by arbitration logic and timing element 40.

Figure 2:
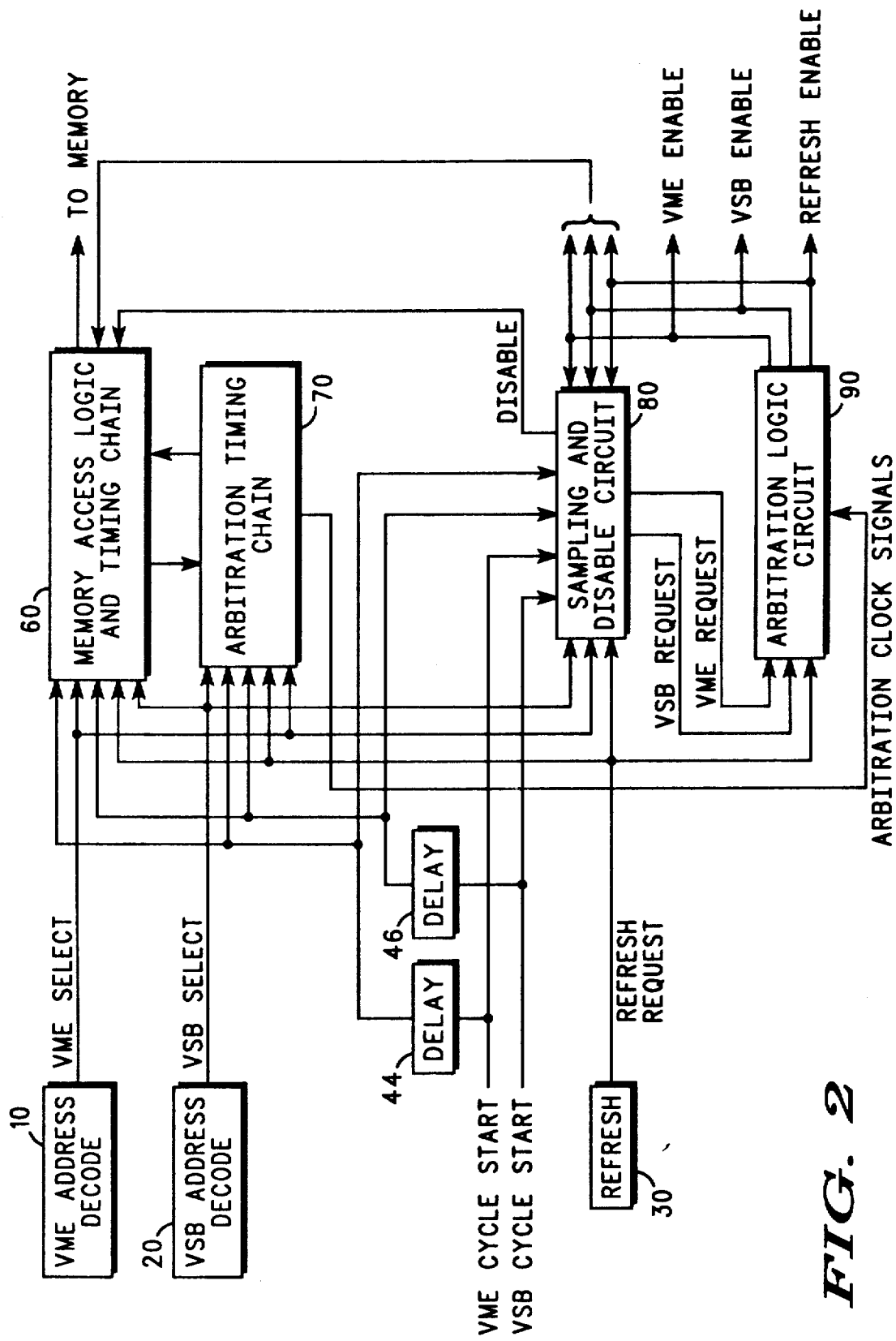
FIG. 2 is a block diagram of a particular embodiment of the present invention.

FIG. 2 is a block-diagram of a concurrent arbitration system for bus control in accordance with the present invention. VME address decode element 10, VSB address decode element 20 and refresh element 30 independently generate signals attempting to gain access to a system resource, in this case a memory. VME address decode element 10 is coupled to memory access logic and timing chain 60, arbitration timing chain 70 and sampling and disable circuit 80. The output of VSB address decode element 20 is also coupled to memory access logic and timing chain 60, arbitration timing chain 70 and sampling and disable circuit 80, while the output of refresh element 30 is coupled to memory access logic and timing chain 60, arbitration timing chain 70, arbitration logic circuit 90 and sampling and disable circuit 80. Memory access logic and timing chain 60 is coupled to arbitration timing chain 70 and has an output for coupling to a memory. Arbitration timing chain 70 is coupled to memory access logic and timing chain 60 and has an output coupled to arbitration logic circuit 90. Sampling and disable circuit 80 has VME request and VSB request outputs coupled to arbitration logic circuit 90 and a disable output coupled to memory access logic and timing chain 60. Arbitration logic circuit 90 has VME enable, VSB enable and refresh enable signals coupled to memory access logic and timing chain 60 and to sampling and disable circuit 80. Sampling and disable circuit 80 receives VME cycle start and VSB cycle start signals both directly and through delays 44 and 46. Delayed VME cycle start and delayed VSB cycle start signals are also received by memory access logic and timing chain 60 and arbitration timing chain 70.

In operation one or more of the VME address decode, VSB address decode and refresh elements may be generating a signal requesting access to the memory. Actual memory access is controlled by memory access logic and timing chain element 60, the output of which controls direct access to the memory. As with previous systems there must be an arbitration decision made between competing requests for access to the memory. This arbitration decision takes place in arbitration logic circuit 90 where the priority in this particular case would be a refresh request, VSB request or VME request in that order. Arbitration logic circuit 90 makes the arbitration decision when directed to by arbitration clock signals from arbitration timing chain 70.

As shown in FIG. 2, VME address decode and VSB address decode elements 10 and 20 serve to decode respective VME and VSB addresses sent to the computer system. The VME and VSB cycle start signals are received at the same time that VME and VSB address signals are received by VME and VSB address decode elements 10 and 20 respectively. These cycle start signals serve to indicate that a request has been received, but not yet decoded, from either the VME or VSB bus. Delay elements 44 and 46 are used to delay the VME and VSB start signals respectively. These delayed cycle start signals are used to qualify the respective decoded VME select and VSB select output signals from the VME and VSB address decode elements. That is, a valid request signal is output from sampling and disable circuit 80 only after a VME or VSB select signal and its corresponding delayed cycle start signal have been received. The delay period should be set to slightly longer than the decode time in order to allow a given select signal to be decoded prior to generation of the corresponding delayed cycle start signal. In practice the VME cycle start and VSB cycle start signals may be any of several signals, such as a data or strobe signal, which occurs at the same time that a corresponding address signal is sent to either of the VME address decode or VSB address decode elements.

Refresh element 30 is an internal means used to generate a periodic refresh signal which is used to refresh the dynamic memory which is the computer resource being accessed in this particular example. Arbitration timing chain element 70 is used to control the timing of the arbitration cycle and provides appropriate timing signals to arbitration logic circuit 90. This arbitration timing chain element starts an arbitration cycle any time that there is present a valid refresh request from element 30; or a valid VME select signal from element 10 and its corresponding delayed cycle start signal from element 44; or a valid VSB select signal from element 20 and its corresponding delayed cycle start signal from element 46. A subsequent arbitration cycle will not start until the previous cycle has been completed. Any particular arbitration cycle is completed based on the inputs existing at the start of the cycle.

Arbitration logic circuit 90 makes the actual arbitration decision in response to arbitration clock signals from arbitration timing chain 70 and the request inputs to arbitration logic circuit 90 at the beginning of a given arbitration cycle. The actual priority for the competing requests is determined by arbitration logic circuit 90 and for this example the highest priority would be a refresh request followed by a VSB request and a VME request in that order. A mutually exclusive enable signal; either VME enable, VSB enable or refresh enable; is output from arbitration logic circuit 90 at all times. This enable signal will correspond to the highest priority request input to arbitration logic circuit 90 at the start of an arbitration cycle. If there is no pending request, the enable signal will revert to that of the most recent previous requester other than refresh.

Sampling and disable circuit 80 is used to generate VME request, VSB request and disable signals. A VME request signal, as indicated earlier, is generated when there is present a valid VME select signal and a corresponding delayed VME cycle start signal. In a similar fashion a VSB request signal is generated when there is present a valid VSB select signal and a corresponding delayed VSB cycle start signal. Separate VME disable and VSB disable signals, represented by the disable output from sampling and disable circuit 80 to memory access logic and timing chain 60, are generated under the following conditions. A VME disable signal is generated to indicate that, at the time a VME cycle start signal is received, an arbitration cycle is in progress which will result in switching memory access to a requester other than VME. The function of this signal and the VSB disable signal will become more apparent in connection with memory access logic and timing chain 60 and later timing diagram discussions which illustrate specific timing sequences. The actual VME disable signal is generated when, at the time of receipt of a VME cycle start signal, there is present a VSB request signal and VSB is not enabled or a refresh request signal is present and refresh is not enabled. In a similar manner a VSB disable signal is generated when, at the time of receipt of a VSB cycle start signal, there is present a VME request signal and VME is not enabled or a refresh request signal is present and refresh is not enabled.

The function of memory access logic and timing element 60 is to control actual access to the memory by the competing requesters. Memory access will be granted under the following conditions:

Access to VME if:
  VME select and
  Delayed VME cycle start and
  VME enable and
  not VME disable and
  previous cycle complete
Access to VSB if:
  VSB select and
  Delayed VSB cycle start and
  VSB enable and
  not VSB disable and
  previous cycle complete
Access to refresh if:
  refresh request and
  refresh enable and
  previous cycle complete Memory access, in accordance with the above rules, will occur under certain conditions without requiring a previous arbitration cycle and under certain conditions while an arbitration cycle is in progress which will switch memory access to another requester.

FIGS. 3A, 3B and 3C illustrate the system response to various combinations of request signals and the resultant granting of memory access. The labels of the various traces represent the various system signals present, where a signal label followed by an asterisk (*) represents an inverted signal which is low (0) for the true state. For example, traces 52 and 56 represent the cycle start signals; 54 and 58 represent the delayed cycle start outputs of elements 44 and 46; 12 and 22 are the VME and VSB request outputs from sampling and disable circuit 80; 32 is the refresh request output of element 30; 92, 94 and 96 are the VME, VSB and refresh enable outputs of arbitration logic circuit 90; 72 represents various arbitration clock signals being passed from arbitration timing chain 70 to arbitration logic circuit 90; 62 represents the output of memory access logic and timing chain 60 which controls access to the memory; and 82 and 84 represent the VME and VSB disable signals from sampling and disable circuit 80 to memory acccess logic and timing chain 60.

In FIG. 3A, prior to time t0 there is no cycle in progress and no current requester as indicated by all three request signals being low (VME request* and VSB request* high and refresh request low). VSB was apparently the most recent previous user as indicated by VSB enable true on trace 94. At time t0 a VME cycle start signal indicates that a VME cycle may be starting which will generate a VME select output. At time t1 delayed VME cycle start goes true indicating that there is a valid VME request, which is also shown on trace 12. At this time VME enable is not true so only an arbitration cycle, as shown on trace 72, will start in accordance with the previously mentioned creteria, i.e. VME select and VME delayed cycle start. As shown on trace 62, there is no immediate memory access as the conditions required are not satisfied. Approximately three fourths of the way through the arbitration cycle (t1 to t2) arbitration logic circuit 90 grants priority to VME since it was the only request present at the start of the arbitration cycle. This is shown by VME enable going true (VME enable* going low) just prior to time t2.

At time t2 a VME memory access cycle starts as a result of the required conditions being met, i.e. VME select and delayed VME cycle start and VME enable and not VME disable and previous cycle complete. The actual memory access is shown by the memory access signal on trace 62. During this memory access cycle by VME (t2 to t3) a simultaneous arbitration cycle is taking place which will switch control to VSB. As noted on traces 56 and 58 a VSB cycle start signal was received and the corresponding delayed VSB cycle start was generated during the previous arbitration cycle (t1 to t2). At time t2 the conditions for an arbitration cycle are satisfied and control will be switched to VSB for the next cycle as indicated by VSB enable going true on trace 94 about three fourths of the way through the VME cycle (t2 to t3). At time t3 conditions are met for the VSB cycle, i.e. VSB select and delayed VSB cycle start and VSB enable and not VSB disable and previous cycle complete. Again memory access is shown on trace 62. At time t4 there is no pending request and the system remains idle awaiting the next request. Since VSB was the most recent previous user VSB enable remains true (VSB enable* low) and immediate memory access would be granted in response to a VSB request. If a VME request were received an arbitration only cycle, such as that starting at t1 would take place.

FIG. 3B illustrates a VME request and VSB request received in rapid succession followed by a refresh request. At time t0 a VME cycle start signal is received as indicated on trace 52. At time t1, before a delayed VME cycle start signal is generated, a VSB cycle start is received as shown on trace 54. At time t2 an arbitration cycle is started as the conditions are met, i.e. VME select and delayed VME cycle start. This is indicated by the arbitration signal on trace 72. A memory access cycle for VSB is not started at time t2 because the conditions are not met, i.e. delayed VSB cycle start is not true (delayed VSB cycle start* high). At time t3 memory access is granted to VSB as the conditions are met, i.e. VSB select and delayed VSB cycle start and VSB enable and not VSB disable and previous cycle complete. This is true even though an arbitration cycle has already started which will switch control to VME. Under these conditions a signal is sent from memory access logic and timing chain 60 to arbitration timing chain 70 which extends the arbitration cycle to end at the same time as the memory access cycle. This is illustrated by the relative length of the arbitration and memory access cycles on traces 72 and 62. As is shown, the first half of the arbitration cycle is extended so that both the arbitration and memory access cycles end simultaneously at time t4. The arbitration cycle which began at time t2 still takes place and control is switched to VME at time t4.

Prior to the start of the VME cycle a refresh request is received as indicated on trace 32 just prior to time t4. This causes an arbitration cycle to be run simultaneously with the VME cycle. Control is switched to refresh at time t5 since both the refresh request and refresh enable signals are true and the previous cycle is complete. At the completion of the refresh cycle (t6) there are no pending requests and enable has been returned to VME since it was the most recent previous user.

FIG. 3C illustrates a case where the disable signal is used to prevent a late VSB cycle because it occurs too late. Starting conditions are the same as for FIG. 3B, VSB is enabled (from a previous cycle) and a VME cycle start is received at time t0. At time t1 the delayed VME cycle start signal goes true and starts an arbitration cycle which will switch control to VME at the start of the next cycle. The value of the VSB disable signal is determined at the time of receipt of the VSB cycle start signal. Since in this case one of the conditions for generating the disable signal (VME delayed cycle start) is in transition it is not known what the outcome of the disable signal decision will be. This is illustrated by the indeterminate VSB disable signal on trace 84 immediately following time t1. The disable signal is not used, however, until time t2 when VSB may or may not be granted memory access. At this time (t2) all conditions for memory access by VSB are satisfied except not VSB disable. Since VSB disable settles true in this case, as shown by trace 84 high at time t2, VSB is not granted access and an arbitration only cycle is run. At time t3 VME is granted memory access and an arbitration cycle is simultaneously run (time t3 to t4) which grants access to VSB for the subsequent cycle (t4 to t5). During this cycle (t4 to t5), while VSB is accessing the memory, an arbitration cycle is run as a result of a new VME request signal and VME is granted memory access at time t5.

As can be seen from the above description, an arbitration system is provided wherein control is granted to either the highest priority current requester or the most recent previous requester. If a request is received from the most recent previous requester immediate access is granted to the memory. During an arbitration cycle which will result in control being switched to one requester, a simultaneous memory access cycle may be taking place by another requester. This overlap results in decreased overall memory access time and therefore faster overall performance by the computer system.

While the system has been described in connection with a very specific VME bus configuration, the concepts and principles could be applied for access to any computer resource by any number of requesters. For example one of the requesters in this case is a refresh means because the resource in this case is a dynamic RAM which must be periodically refreshed. The resource need not be a memory and any number of competing requesters could be accommodated using a system such as that herein described. The particular system described herein was implemented using a combination of discrete components and programmable array logic devices, but any means could be used which would accomplish the desired logic and timing functions. The timing diagrams are likewise merely illustrative of a particular implementation and not intended as a limitation of the broad concept illustrated thereby.

What has been provided therefore is a concurrent arbitration method for bus control which in certain situations allows overlapping actual memory access and arbitration cycles thereby reducing overall memory access cycle time and improving system performance. It is to be clearly understood that while this system has been described in conjunction with a specific system resource, in this case a memory, and specific requesters, in this case a VME bus and VSB bus in conjunction with a memory refresh signal, that the method and system described could be used in conjunction with any computer system wherein various asynchronous requests are asserted for access to a given computer resource. Variations in the particular interfaces and timing signals may be provided by one skilled in the art without departing from the scope of the invention as described and claimed.

We claim:

1. A computer resource arbitration system for controlling access to a resource by a plurality of requesters, at least two of which are capable of generating corresponding cycle start signals and resource request signals, and for granting access to said resource by a first requester generating a first cycle start signal even though said first requester had been granted the immediately preceding access to said resource and a second requester generated a second resource request signal before said first requester generated said first cycle start signal, comprising:

arbitration logic means, responsive to the receipt of said first and second resource request signals for generating a requester enable signal on behalf of a requester granted highest priority according to a predetermined priority, said arbitration logic means requiring an arbitration cycle of at least a first predetermined time interval to generate said requester enable signal;

additional logic means for determining whether said first requester generated said first cycle start signal before said second requester generated said second resource request signal and for determining whether a requester enable signal generated during an immediately preceding arbitration cycle is coincidentally being asserted on behalf of said first requester and, if both of said determinations are true, generating a resource access signal on behalf of said first requester, said resource access signal being generated prior to the expiration of said first predetermined time interval; and memory access means for immediately granting access to said first requester if said resource access signal is generated by said additional logic means and for granting access to said resource by said requester having highest priority based on said corresponding resource access signal after a previous memory access cycle is complete, said access to said resource by said first requester in response to said resource access signal occuring simultaneously with said arbitration logic means determining which requester has highest priority.

2. A computer resource arbitration system in accordance with claim 1 wherein said resource is a memory.

3. A computer resource arbitration system in accordance with claim 1 wherein one of said at least two requesters is a VME bus.

4. A computer resource arbitration system in accordance with claim 5 wherein another of said at least two requesters is a VSB bus.

5. A computer resource arbitration system in accordance with claim 1, further comprising:

means for generating a disable signal applicable to said first requester if, upon receipt of said first cycle start signal, said second resource request signal has already been received and no requester enable signal has been generated on behalf of said second resource request signal.

6. A computer resource arbitration system in accordance with claim 5 wherein said additional logic means is also responsive to said disable signal, and wherein said additional logic means generates said resource access signal on behalf of said first requester only if both of said determinations are true and said disable signal is not asserted.

7. A system as recited in claim 1, further comprising: means for extending said arbitration cycle of said arbitration logic means until said first requester completes access of said resource if said memory access means immediately granted access to said first requester based on said resource access signal generated by said additional logic means.

8. A method of a computer resource arbitration system for prioritizing a plurality of signals from a plurality of requesters which are seeking access to a resource, each of said requesters generating a cycle start signal for requesting access to said resource, said computer system being connectable to receive said signals, said method comprising the steps of:
   a) generating a request signal for each requester generating a cycle start signal;
   b) arbitrating which of said requesters requesting access to said resource has highest priority for accessing said resource during a subsequent memory access cycle based on said request signals;
   c) granting a first requester of said requesters requesting access to said resource immediate access to said resource during said arbitrating in step (b) if said first requester was last to access said resource, said first requester generated a corresponding cycle start signal before a request signal was generated by another requester and a previous memory access cycle is complete;
   d) generating an enable signal for a second requester with highest priority in response to said arbitrating performed in step (b); and
   e) granting said second requester access to said resource if said previous memory access cycle is complete and said enable signal generated in step (d) corresponds to said second requester.

9. A method as recited in claim 8, wherein step (b) comprises the sub-steps of:
   b1) executing said arbitrating within an arbitration cycle; and
   b2) extending said arbitration cycle until said first requester is finished accessing said resource if said first requester is granted access to said resource in step (c).

10. A method of a computer resource arbitration system for arbitrating a plurality of signals from a plurality of requesters which are seeking access to a resource, said computer system being connectable to receive said signals, said method comprising the steps of:
   a) receiving an address signal and a cycle start signal for each of said requesters wanting access to said system;
   b) generating a select signal by decoding said address signal for each of said requesters;
   c) delaying said cycle start signal until said decoding of said address signal is complete;
   d) generating a request signal after receiving said cycle start signal and said delayed cycle start signal;
   e) starting an arbitration cycle if a previous arbitration cycle is complete and in response to receiving said select signal and said delayed cycle start signal;
   f) arbitrating which requester of said requesters has highest priority for accessing said resource during a subsequent memory access cycle;
   g) generating an enable signal for said requester based on said arbitrating performed in step (f);
   h) granting said requester immediate access to said resource if said requester was last to access said resource, said requester generated said corresponding cycle start signal before a request signal was generated by another requester and a previous arbitration cycle is complete; and
   i) granting said requester access to said resource if said previous arbitration cycle is complete and said enable signal is generated in step (g) for said requester.

* * * * *